US008216687B2

(12) United States Patent
Burd et al.

(10) Patent No.: US 8,216,687 B2
(45) **Date of Patent: *Jul. 10, 2012**

(54) THERMAL BARRIER COATING

(75) Inventors: Steven W. Burd, Cheshire, CT (US); Robert M. Sonntag, Manchester, CT (US); Kevin W. Schlichting, Storrs, CT (US)

(73) Assignee: United Technologies Corporation, Hartford, CT (US)

( * ) Notice: Subject to any disclaimer, the term of this patent is extended or adjusted under 35 U.S.C. 154(b) by 452 days.

This patent is subject to a terminal disclaimer.

(21) Appl. No.: 12/054,801

(22) Filed: Mar. 25, 2008

(65) Prior Publication Data

US 2008/0171222 A1 Jul. 17, 2008

Related U.S. Application Data

(62) Division of application No. 10/968,322, filed on Oct. 18, 2004, now Pat. No. 7,413,808.

(51) Int. Cl.

*B32B 9/00* (2006.01)
*B05D 1/36* (2006.01)

(52) U.S. Cl. ...................... 428/469; 428/472; 427/419.2

(58) Field of Classification Search ........................ None
See application file for complete search history.

(56) References Cited

U.S. PATENT DOCUMENTS

| | | | |
|---|---|---|---|
| 4,405,659 | A | 9/1983 | Strangman |
| 4,898,368 | A | 2/1990 | Schaffer et al. |
| 5,087,477 | A | 2/1992 | Giggins, Jr. et al. |
| 5,660,885 | A | 8/1997 | Hasz et al. |
| 5,683,761 | A | 11/1997 | Bruce et al. |
| 5,773,141 | A | 6/1998 | Hasz et al. |
| 6,060,177 | A | 5/2000 | Bornstein et al. |
| 6,382,920 | B1 | 5/2002 | Dopper |
| 6,413,578 | B1 | 7/2002 | Stowell et al. |
| 6,572,981 | B2 | 6/2003 | Spitsberg |
| 6,620,525 | B1 | 9/2003 | Rigney et al. |
| 6,821,641 | B2 | 11/2004 | Bruce et al. |
| 7,226,672 | B2 | 6/2007 | Litton et al. |

*Primary Examiner* — Timothy Speer
(74) *Attorney, Agent, or Firm* — Bachman & LaPointe, P.C.

(57) ABSTRACT

An article has a metallic substrate having a first emissivity. A thermal barrier coating atop the substrate may have an emissivity that is a substantial fraction of the first emissivity.

22 Claims, 5 Drawing Sheets

THERMAL BARRIER COATING

CROSS-REFERENCE TO RELATED APPLICATION

This is a divisional application of Ser. No. 10/968,322, filed Oct. 18, 2004, and entitled THERMAL BARRIER COATING, issued Aug. 19, 2008 as U.S. Pat. No. 7,413,808, the disclosure of which is incorporated by reference herein in its entirety as if set forth at length.

BACKGROUND

The disclosure relates to thermal barrier coatings (TBCs). More particularly, the disclosure relates to TBCs applied to superalloy gas turbine engine components.

The application of TBCs, such as yttria-stabilized zirconia (YSZ) to external surfaces of air-cooled components, such as air-cooled turbine and combustor components is a well developed field. U.S. Pat. No. 4,405,659 to Strangman describes one such application. In Strangman, a thin, uniform metallic bonding layer, e.g., between about 1-10 mils, is provided onto the exterior surface of a metal component, such as a turbine blade fabricated from a superalloy. The bonding layer may be a MCrAlY alloy (where M identifies one or more of Fe, Ni, and Co), intermetallic aluminide, or other suitable material. A relatively thinner layer of alumina, on the order of about 0.01-0.1 mil (0.25-2.5 μm), is formed by oxidation on the bonding layer. Alternatively, the alumina layer may be formed directly on the alloy without utilizing a bond coat. The TBC is then applied to the alumina layer by vapor deposition or other suitable process in the form of individual columnar segments, each of which is firmly bonded to the alumina layer of the component, but not to one another. The underlying metal and the ceramic TBC typically have different coefficients of thermal expansion. Accordingly, the gaps between the columnar segments enable thermal expansion of the underlying metal without damaging the TBC.

U.S. Pat. No. 6,060,177 to Bornstein et al. (the disclosure of which is incorporated by reference herein as if set forth at length) describes use of an overcoat of chromia and alumina atop a yttria-stabilized zirconia (YSZ) TBC. Such an overcoat may protect against sulfidation attack and oxidation and may significantly extend the operational life of the component.

SUMMARY OF THE INVENTION

One aspect of the disclosure involves an article including a metallic substrate having a first emissivity. A TBC is atop the substrate and has an emissivity at least 70% of the first emissivity, in whole or part over the wavelengths of concern to gray or blackbody radiation, including infrared wavelengths.

In various implementations, the TBC may consist essentially of alumina and chromia. The TBC may consist in major part of a combination of alumina and chromia. The TBC may include a layer consisting in major part of alumina and chromia. The layer may have a thickness in excess of 250 μm. The thickness may be between 250 μm and 640 μm. The thickness may be between 280 μm and 430 μm. The layer may have a thermal conductivity of 5-20 BTU inch/(hr-sqft-F). The layer may be an outermost layer and there may be a bondcoat layer between the outermost layer and the substrate. The substrate may consist essentially of or comprise a nickel- or cobalt-based superalloy, a refractory metal-based alloy, a ceramic matrix, or another composite. The article may be used as one of a gas turbine engine combustor panel (e.g., heat shield or liner), turbine blade or vane, turbine exhaust case fairing or heat shield, nozzle flaps or seals, and the like. The TBC may have a uniform composition over a thickness span starting at most 10% below an outer surface and extending to at least 50%.

Another aspect of the disclosure involves a method for manufacturing an article. A metallic substrate is provided. A bondcoat layer is applied over a surface of the substrate. A TBC layer is applied over the bondcoat layer. The TBC consists in major part of a combination of alumina and chromia. The TBC layer has a thickness in excess of 250 μm.

In various implementations, the bondcoat layer may have a thickness less than the thickness of the TBC layer. The substrate may be formed by at least one of casting, forging, and machining of a nickel- or cobalt-based superalloy, refractory material, or composite system.

Another aspect of the disclosure involves a method of remanufacturing an apparatus or reengineering a configuration of the apparatus from a first condition to a second condition. The method involves replacing a first component with a second component. The first component has a first substrate in a first coating system. The second component has a second substrate and a second coating system. A first emissivity difference between the first substrate and the first coating system is greater than a second emissivity difference between the second substrate and the second coating system.

In various implementations, the first coating system may be less conductive (or more insulative) than the second coating system. The second coating system may be thicker than the first coating system. The first and second substrates may be essentially identical (e.g., in composition, structure, shape, and size). The apparatus may be a gas turbine engine. The first and second components may be subject to operating temperatures in excess of 1350 C.

Another aspect of the disclosure involves an article having a metallic substrate having a first emissivity. A TBC is atop the substrate and includes means for limiting thermally-induced fatigue or creep in the substrate. This limitation may apply to instances both prior to and after which the TBC has spalled. The TBC may consist essentially of alumina and chromia.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
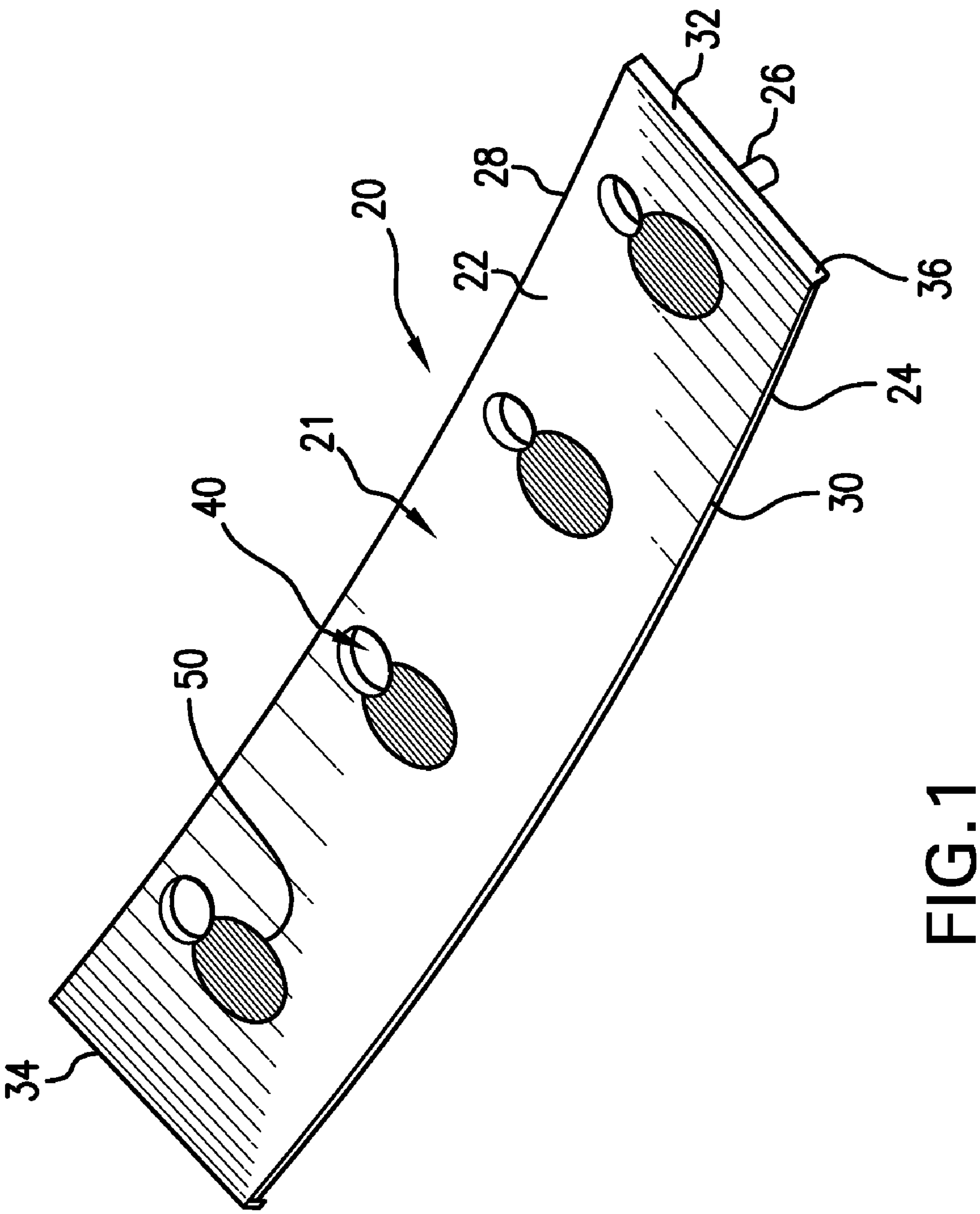
FIG. 1 is a view of a gas turbine engine combustor panel.

FIG. 1 shows a turbine engine combustor panel 20 which may be formed having a body 21 shaped as a generally frustoconical segment having inboard and outboard surfaces 22 and 24. The exemplary panel is configured for use in an annular combustor circumscribing the engine centerline. In the exemplary panel, the inboard surface 22 forms an interior surface (i.e., facing the combustor interior) so that the panel is an outboard panel. For an inboard panel, the inboard surface would be the exterior surface. Accordingly, mounting features such as studs 26 extend from the outboard surface for securing the panel relative to the engine. The exemplary panel further includes an upstream/leading edge 28, a downstream/trailing edge 30 and lateral edges 32 and 34. Along the edges or elsewhere, the panel may include rails or standoffs 36 extending from the exterior surface 24 for engaging a combustor shell (not shown). The exemplary panel includes a circumferential array of large apertures 40 for the introduction of process air. Smaller apertures (not shown) may be provided for film cooling. Moreover, select panels may accommodate other openings for spark plug or igniter placement.

With conventional TBC systems, we have observed certain failure modes in regions 50 (schematically shown) downstream of the holes 40 or other large orifices. Other failure regions are: (1) upstream and about the circumference of holes; (2) near the panel edges; and (3) various other local regions about the combustor which see streaks of combustion products which, due to their luminosity and/or temperature, impart locally high-levels or radiation loading to the parts. The failures are characterized by cracking of the panel substrate (e.g., Ni- or Co-based superalloy) shortly after a delamination or spalling of the TBC in the vicinity of the region of failure or, in some cases, without incident of coating failure. It is believed the cracking results from thermal fatigue and creep due to high temperature gradients and local temperatures in the substrate between regions of lost TBC and regions of intact TBC or below the TBC surface. The gradients may result from a combination of: increased heat transfer to the area that has lost the TBC; and differential optical or radiative loading attributed to the higher emissivity of the exposed substrate relative to the intact TBC. For example, a substrate may have an emissivity in the vicinity of 0.8-0.9 (broadly over wavelengths driving radiative heat transfer (e.g., 1-10 μm)) whereas the TBC may have an emissivity in the range of 0.2-0.5. In operation, these can lead to temperature differences in the vicinity of 100-150 C over relatively short distances of 20-50 mm (e.g., when exposed to temperatures in excess of 900 C or even in excess of 1350 C). Accordingly, a modified TBC with an increased emissivity (i.e., a darker TBC) may reduce the post-spalling differential optical or radiative load and inherent thermal gradients and, thereby, may delay component damage and subsequent failure. One possible high emissivity TBC involves an alumina-chromia combination such as is used in Bornstein et al. as an overcoat. Accordingly, the disclosure of Bornstein et al. is incorporated by reference herein as if set forth at length to the extent it describes coating methods and compositions.

Figure 2:
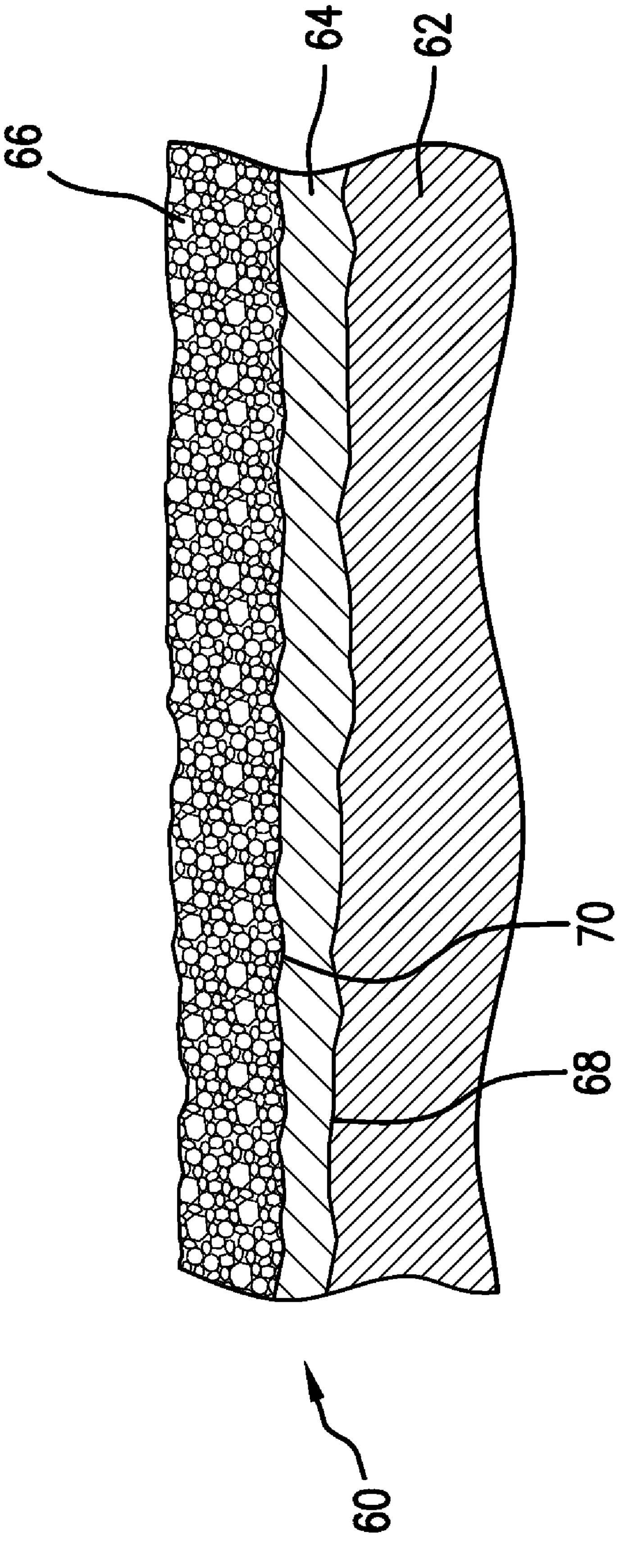
FIG. 2 is a partially schematic cross-sectional view of a coating system on the panel of FIG. 1.

FIG. 2 shows a coating system 60 atop a superalloy substrate 62. The system may include a bondcoat 64 atop the substrate 62 and a TBC 66 atop the bondcoat 64. In an exemplary process, the bondcoat 64 is deposited atop the substrate surface 68. One exemplary bondcoat is a MCrAlY which may be deposited by a thermal spray process (e.g., air plasma spray) or by an electron beam physical vapor deposition (EBPVD) process such as described in Strangman. An alternative bondcoat is a diffusion aluminide deposited by vapor phase aluminizing (VPA) as in U.S. Pat. No. 6,572,981 of Spitsberg. An exemplary characteristic (e.g., mean or median) bondcoat thicknesses 4-9 mil (100-230 μm).

In an exemplary embodiment, the TBC 66 is deposited directly atop the exposed surface 70 of the bondcoat 64. An exemplary TBC comprises chromia and alumina. For example, a solid solution of chromia and alumina may be deposited by air plasma spraying as disclosed in Bornstein et al. The exemplary characteristic thickness for the alumina-chromia TBC 66 is preferably at least 10 mil (250 μm). For example, it may be 10-30 mil (250-760 μm), more narrowly, 10-25 mil (250-640 μm), and yet more narrowly, 11-17 mil (280-430 μm). Exemplary alumina-chromia coatings may consist essentially of the alumina and chromia or have up to 30 weight percent other components. For the former, exemplary chromia contents are 55-93% and alumina 7-45%. The alumina-chromia coating in a multi-layer system may provide an exemplary at least 50% of the insulative capacity of the coating system. It may represent at least 50% of the thickness of the system. More narrowly, it may represent 60-95% of the insulative capacity and 60-80% of the thickness.

Alternative TBCs may include silicon carbide or other coatings providing a good emissivity match for the exposed post-spalling surface (i.e., the bond coat, metallic coating, or substrate exposed following spalling). For example, the effective coating emissivity may be at least 40% that of the post-spalling surface, more advantageously, at least 70%, 80%, or 90% (e.g., coating emissivity of 0.5-0.8 or more) contrasted with about 30% for a light TBC.

The foregoing principles may be applied in the remanufacturing of a gas turbine engine or the reengineering of an engine configuration. The remanufacturing or reengineering may replace one or more original components with one or more replacement components. Each original component may have a first superalloy substrate with a first coating system. Each replacement component may have a second superalloy substrate with a second coating system. Other components (including similarly coated components) may remain unchanged in the reengineering or remanufacturing. The emissivity difference between the second substrate and the second coating system may be smaller than that of the first. Where the first and second substrates are essentially identical, and the first coating emissivity is less than the first substrate emissivity, the second coating emissivity may be greater than the first coating emissivity. Although the second coating system may possibly be more insulative than the first coating system, the benefits of emissivity compatibility potentially justify use even where the second coating system is less insulative than the first coating system. For example, the first coating system may be 1.5 to ten times more insulative than the second. Thus, although the second substrate may operate overall hotter than the first, it may suffer lower levels of spatial and/or temporal temperature fluctuations.

Figure 3:
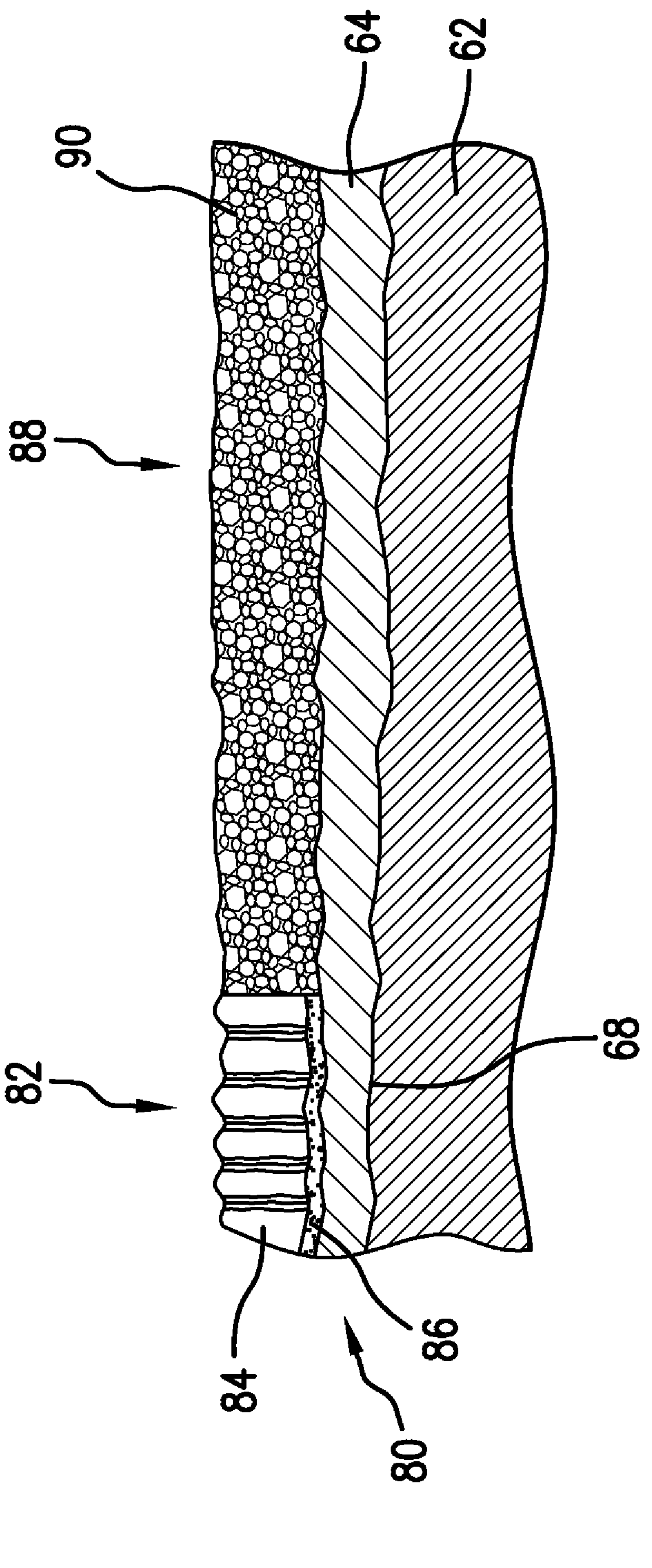
FIG. 3 is a partially schematic cross-sectional view of a first alternate coating system on the panel of FIG. 1.

FIG. 3 shows an alternate coating system 80. In an area or region 82 of expected high thermal loading (e.g., the region 50), the system includes a low-emissivity (light) TBC 84 (e.g., an emissivity of 0.2-0.5). An exemplary light TBC 84 may be YSZ and may be associated with an alumina layer 86 atop the bondcoat 64 (e.g., as disclosed in Bornstein et al.) Additional coating layers atop the TBC 84 may also be possible (e.g., as disclosed in Bornstein et al.). In a lower thermal loading area or region 88, a dark TBC 90 may be applied atop the bondcoat 64 (e.g., in similar compositions, and the like as the TBC 66). On yet other areas of the substrate (not shown) subject to yet less heating or thermal loading, there may be no TBC or a yet reduced TBC.

While intact, the light TBC 84 helps keep the region 82 cooler than in the system 60. This helps reduce differential thermal loading in the substrate and may help further delay spalling. However, once spalling occurs it will essentially be limited to loss of the light TBC 84 and not the dark TBC 90. Clearly, the limit of spalling need not be exactly along the boundary between the TBCs 84 and 90. The limit may be on either side or may cross the boundary. This leaves a similar emissivity balance between spalled and unspalled regions as does the embodiment of FIG. 2. To apply the two distinct TBCs, one of the two regions could be masked while one of the TBCs is applied to the other region. Thereafter, after demasking, the other region could be masked while the other TBC is applied and the second mask removed. In the figures, a relatively sharp demarcation is shown between the TBC's and/or their layers for purposes of illustration. However, a variety of engineering and/or manufacturing considerations may cause more gradual transitions.

Figure 4:
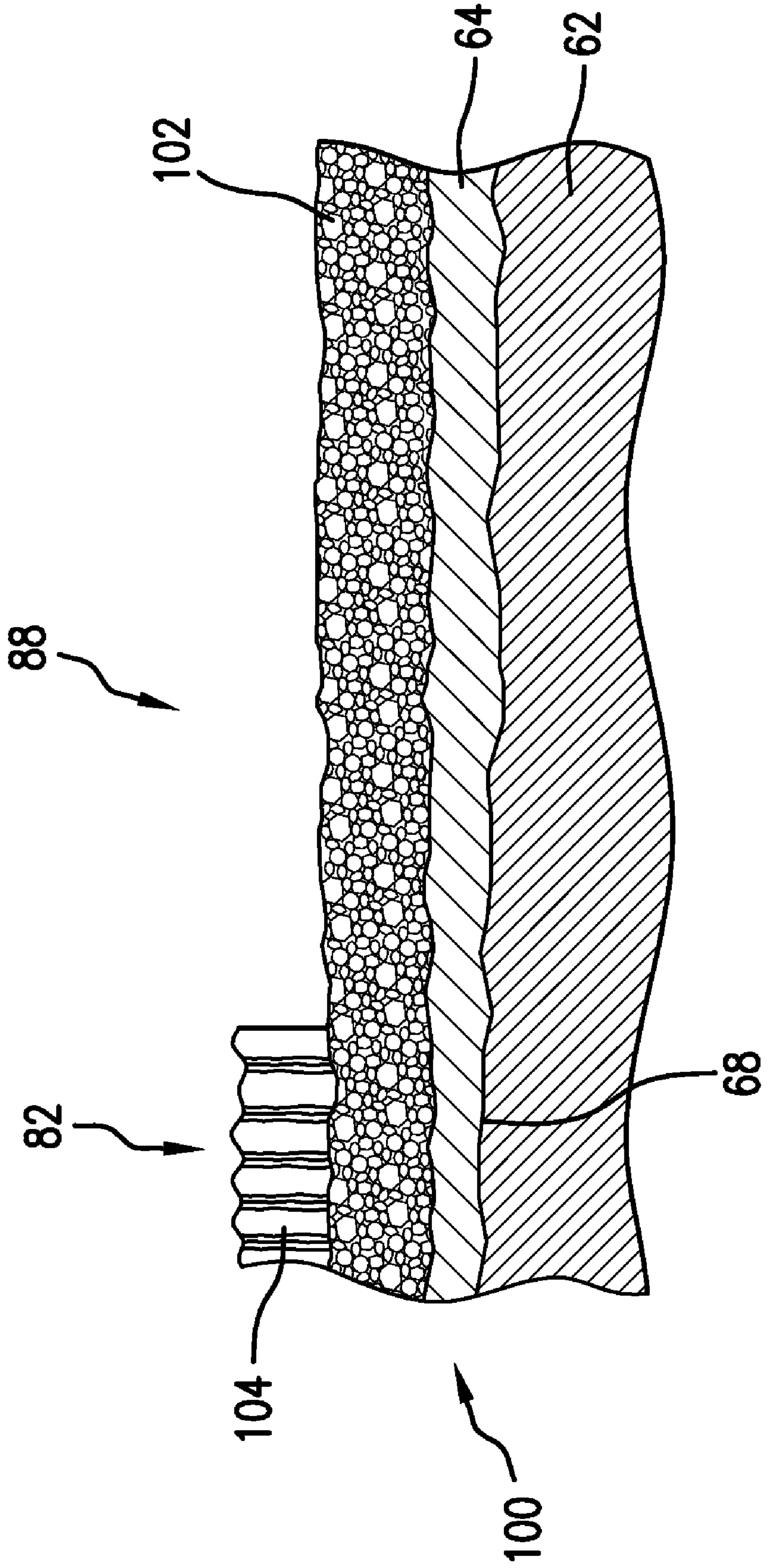
FIG. 4 is a partially schematic cross-sectional view of a second alternate coating system on the panel of FIG. 1.

FIG. 4 shows a system 100 in which one of the two masking steps associated with the exemplary application of the system 80 is avoided. The exemplary system 100 includes a dark TBC 102 similar to the dark TBC 66 and applied over both the higher load region 82 and the adjacent lower load region 88. Essentially limited to the high load region, a light TBC 104 (e.g., similar to light TBC 84) may be applied atop (e.g., directly atop or with an intervening layer) the dark TBC 102 (e.g., similar to the TBC 66). Thus, masking is not required during the application of the dark TBC 102 but may be applied in the region 88 during application of the light TBC 104. As with the system 80, the system 100 provides preferential heat rejection along the region 82 in pre-spalling operation. Spalling may involve loss of both the light TBC 104 and the portion of the dark TBC 102 immediately therebelow (either in a single spalling event or a staged spalling event). After such spalling, the essentially intact dark TBC 102 in the region 88 provides similar advantages as does that of the systems 60 and 80.

Figure 5:
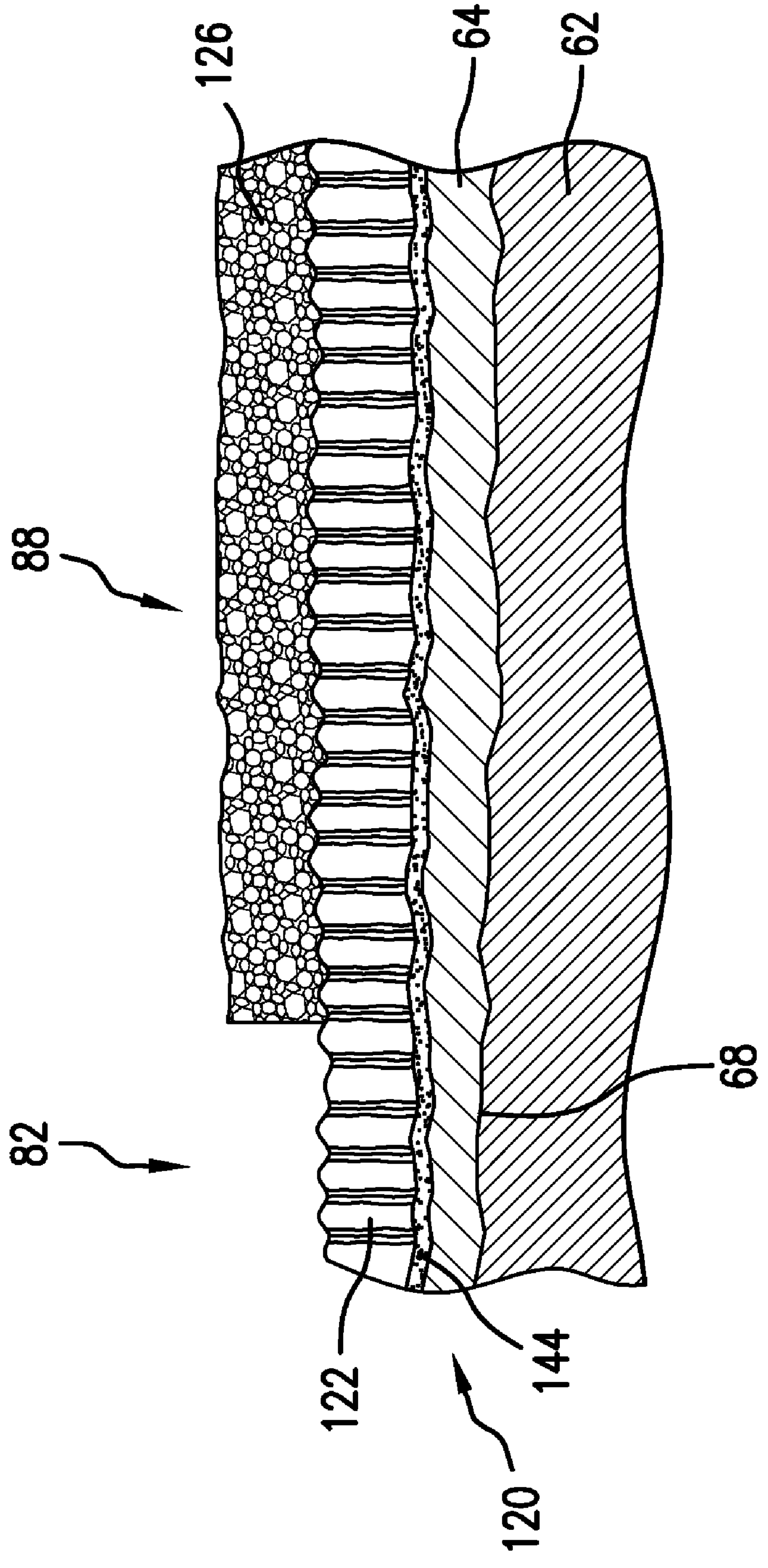
FIG. 5 is a partially schematic cross-sectional view of a third alternate coating system on the panel of FIG. 1.

FIG. 5 shows an alternate coating system 120 reversing the situation relative to the system 100. A light TBC 122 (and optional alumina layer 124) are applied over both the regions 82 and 88. Thereafter, the region 82 is masked and a dark TBC 126 is applied over the region 88. Pre-spalling, the exposed light TBC in the high load region 82 offers preferential heat rejection similar to that of the systems 80 and 100. The spalling may essentially entail loss of that exposed portion of the light TBC 122, leaving the dark TBC 126 essentially intact.

One or more embodiments have been described. Nevertheless, it will be understood that various modifications may be made. For example, details of any particular application may influence details of any particular implementation. Accordingly, other embodiments are within the scope of the following claims.

What is claimed is:

1. An article comprising:
a metallic substrate; and
a coating system atop the substrate and comprising:
an alumina-chromia layer having:
a thickness at least 50% of a total thickness of the system; and
a bondcoat between the substrate and the alumina-chromia layer.

2. The article of claim 1 wherein:
a median thicknesses of the bondcoat is 100-230 μm; and
a median thicknesses of the alumina-chromia layer is 280-430 μm.

3. The article of claim 1 wherein:
the alumina-chromia layer provides 60-95% of an insulative capacity of the coating system and 60-80% of a thickness of the coating system.

4. The article of claim 1 wherein:
the coating system consists essentially of the alumina-chromia layer and the bondcoat.

5. The article of claim 1 wherein:
the substrate has a first emissivity at 1350 C;
the coating system is a first coating system on a first region of the substrate and having a second emissivity at 1350 C of least 70% of the first emissivity; and
along a second region of the substrate, the article comprises a second coating system having a third emissivity at 1350 C of 20-50% of the first emissivity.

6. The article of claim 1 wherein:
the coating system is a first thermal barrier coating essentially in a relatively low thermal load region of the substrate; and
a second coating system is in a relatively high load region of the substrate and having a lower emissivity than the first coating system.

7. The article of claim 1 wherein:
the alumina-chromia layer consists essentially of 55-93% chromia and 7-45% alumina by weight.

8. The article of claim 1 wherein:
the alumina-chromia layer consists in majority mass part of a combination of alumina and chromia.

9. The article of claim 1 wherein:
a median thicknesses of the alumina-chromia layer is in excess of 250 μm.

10. The article of claim 1 wherein:
the alumina-chromia layer has a thermal conductivity of 5-20 BTU-inch/(hr-sqft-F).

11. The article of claim 1 wherein:
the substrate comprises a nickel- or cobalt-based superalloy.

12. The article of claim 1 used as one of:
a gas turbine engine combustor panel;
gas turbine engine turbine exhaust case component; or
gas turbine engine turbine nozzle component.

13. The article of claim 1 wherein:
the alumina-chromia layer has a uniform composition over a thickness span starting at least 10% below an outer surface and extending to at least 50%.

14. A method for manufacturing the article of claim 1, the method comprising:
providing the metallic substrate;
applying the bondcoat over a surface of the substrate; and
applying the alumina-chromia layer over the bondcoat, the alumina-chromia layer having a thickness in excess of 250 μm.

15. The method of claim 14 wherein the bondcoat layer has a thickness of less than said thickness of the alumina-chromia layer.

16. The method of claim 14 forming the substrate by at least one of casting and machining of a nickel- or cobalt-based superalloy.

17. An article comprising:
a metallic substrate; and
a thermal barrier coating atop the substrate and comprising means for limiting post-spalling thermal fatigue.

18. The article of claim 17 wherein:
the thermal barrier coating consists essentially of alumina and chromia.

19. The article of claim 17 wherein the means further provides pre-spalling preferential heat rejection from a high load region relative to a low load region.

20. The article of claim 17 wherein the means comprises:
a first thermal barrier coating layer over a relatively high load region but not a relatively low load region; and
a second thermal barrier coating layer over the relatively low load region but not the relatively high load region, the second thermal barrier coating layer being relatively darker compared to the first thermal barrier coating layer.

21. The article of claim 17 wherein the means comprises:

a first thermal barrier coating layer across both a high load region and a low load region; and a second thermal barrier coating layer atop the first thermal barrier coating layer along the high load region but not the low load region, the first thermal barrier coating layer being relatively dark compared to the second thermal barrier coating layer.

22. The article of claim 17 wherein the means comprises:

a first thermal barrier coating layer across both a high load region and a low load region; and a second thermal barrier coating layer atop the first thermal barrier coating layer along the low load region but not the high load region, the second thermal barrier coating layer being relatively dark compared to the first thermal barrier coating layer.

* * * * *